United States Patent
Horton

[15] 3,706,215
[45] Dec. 19, 1972

[54] ROTARY PIPE STRAIGHTENER
[72] Inventor: Herbert D. Horton, P.O. Box 6434, Odessa, Tex. 79760
[22] Filed: Feb. 19, 1971
[21] Appl. No.: 116,767

[52] U.S. Cl. ..........................................72/99, 72/101
[51] Int. Cl. ................................................B21d 3/04
[58] Field of Search.....................72/164, 99, 95, 101

[56] References Cited

UNITED STATES PATENTS

| | | | |
|---|---|---|---|
| 2,319,785 | 5/1943 | Abramsen | 72/99 |
| 3,590,618 | 1/1969 | Hyams | 72/99 |
| 3,492,850 | 2/1970 | Groppini | 72/99 |
| 3,187,536 | 6/1965 | Zolton | 72/99 |
| 3,533,257 | 10/1970 | Aldred | 72/99 |
| 2,334,886 | 11/1943 | Siegerist | 72/99 |

*Primary Examiner*—Milton S. Mehr
*Attorney*—Wayland D. Keith

[57] ABSTRACT

A pipe straightener which utilizes V-shaped upper and lower rollers combined with hydraulic cylinders to apply pressure between alternate V-shaped rollers so as the pipe is moved between the rollers the bends and twists are removed therefrom. By adjusting the top and bottom rollers from a right angle with respect to the pipe up to approximately 45° with the upper rollers being adjusted in opposite angular relation to the lower rollers, pipe may be readily straightened. At least some of the upper rollers and some of the lower rollers are power driven, preferably with hydraulic motors, the conduits of which hydraulic motors are connected in series so that all the rollers will be driven at a uniform speed, with certain rollers being idler rollers. The entire device may be mounted on a structural frame, which in turn is mounted on a trailer axle and may be trailed from place to place, which obviates the necessity of bringing the bent or "cork screwed" pipe to the machine. A V-trough is provided, at one end of the machine, to guide the pipe to and between the rollers and a cone shaped guide is provided at the opposite end for guiding the pipe outward therefrom. The source of hydraulic power is usually furnished by the vehicle towing device, however, a separate and independent hydraulic system, having an outside source of power, may be used, such as a motor or internal combustion engine. Both the upper and lower V-shaped rollers are adjustable to vary the center distances between the rollers to enable the device to be used on pipe of all sizes.

9 Claims, 8 Drawing Figures

PATENTED DEC 19 1972
3,706,215
SHEET 1 OF 2
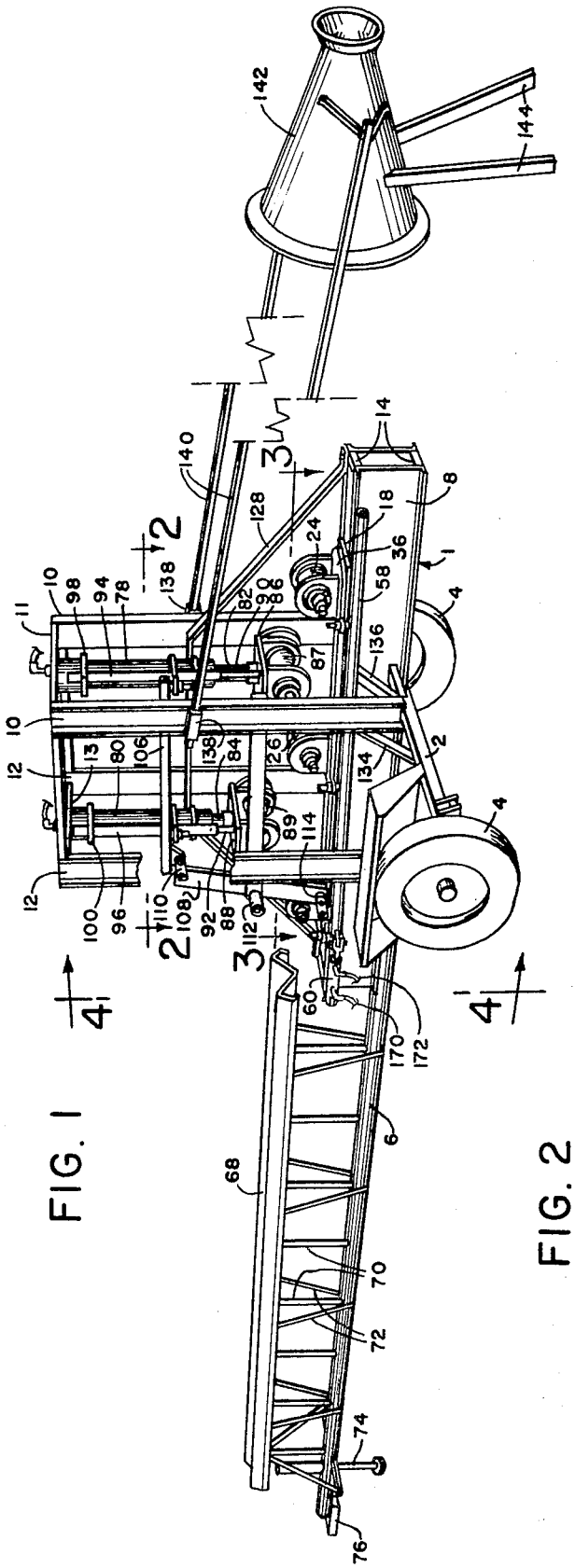
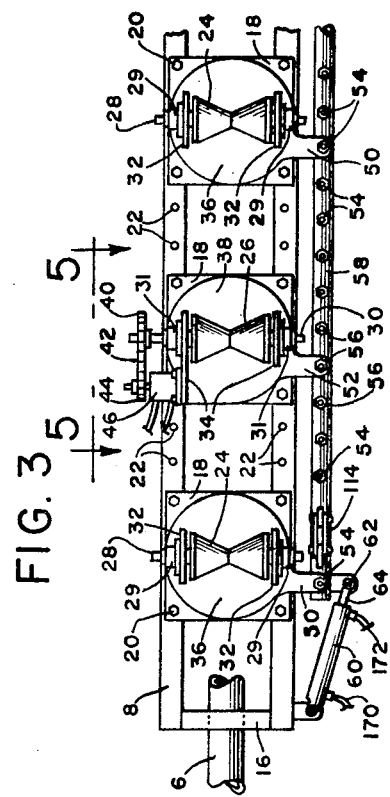
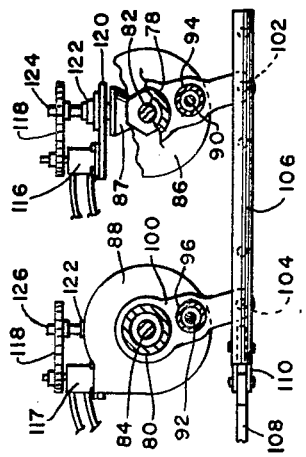
INVENTOR.
HERBERT D. HORTON
BY
Wayland D. Keith
HIS AGENT.

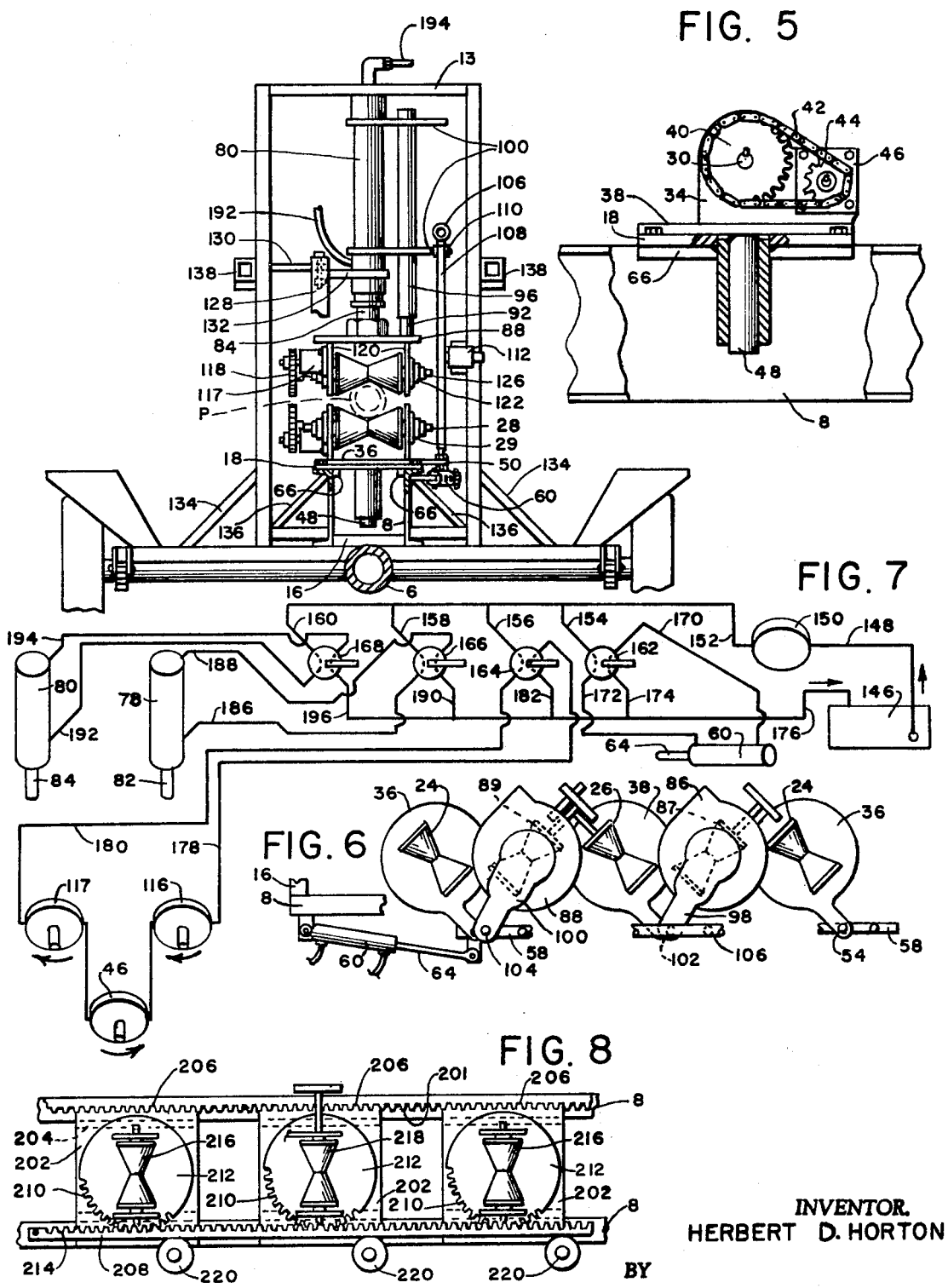

ROTARY PIPE STRAIGHTENER

BACKGROUND OF THE INVENTION

The present invention relates to pipe straighteners, and more particularly to a straightener that passes the pipe longitudinally therethrough.

It is desirable to rotate the pipe between a plurality of V-shaped rollers to remove the bends and twists from the pipe, the construction of which is simple, compact, and portable, yet sturdy and reliable in operation and requiring a minimum of maintenance.

It is difficult to provide an effective pipe straightening apparatus incorporating the above mentioned design characteristics. Prior art pipe straighteners of this general type have either employed rather bulky, stationary mechanisms for handling the pipe, many of which do not provide satisfactory pipe straightening characteristics.

SUMMARY OF THE INVENTION

A structural frame, which is preferably portably mounted, supports a plurality of spaced apart V-shaped rollers, having transverse axes, over which pipe is passed. A superstructure mounts a plurality of mechanically actuated pressing elements, such as hydraulic rams, each which mechanical pressing element has a V-shaped roller positioned on the lower end thereof with the center of the V-portion normally lying in a longitudinal plane that passes medially through the V-shaped rollers which are mounted on the structural frame.

A plurality of V-shaped rollers are mounted on axes which are normally parallel but which are preferably adjustable up to 45°, with the V-shaped rollers being so mounted that opposed rollers are positioned intermediate the first set of rollers with some of the rollers of each set of rollers being power driven and some of the rollers being idler rollers.

A V-shaped pipe rack is positioned in aligned relation with the V-rollers so that pipe may be passed therethrough, with the angular positions of the V-shaped rollers being adjustable so that the power rollers will move the pipe in either direction longitudinally, and with one set of rollers positioned at one angle, and the other set of rollers positioned at an opposed angle, the pipe will be straightened and cleaned as the pipe is moved longitudinally back and forth, with a guide means to guide the pipe as it is discharged from the pipe straightener. With this construction, the pipe straightening apparatus will straighten pipe expeditiously and accurately with a minimum crew and with a maximum of efficiency.

PRIOR ART

The following prior art patents were located, considered, and the patent numbers thereof are submitted herewith:

| | | |
|---|---|---|
| 1 985 757 | Abramsen | Dec. 25, 1934 |
| 2 163 669 | Didden | June 27, 1939 |
| 2 411 395 | Sutton | Nov. 19, 1946 |
| 2 996 789 | Pridy | Aug. 22, 1961 |
| 3 054 438 | Wegner et al | Sept. 18, 1962 |

OBJECTS OF THE INVENTION

An object of the invention is to provide a portable, rotary pipe straightener that can be moved from place to place, which is self-contained and through which the pipe may be passed to clean and straighten the pipe simultaneously in a minimum of time.

Another object of the invention is to provide a pipe straightener which utilizes a multiplicity of V-shaped rollers, some of which are power driven, so as to direct pipe back and forth longitudinally therethrough until the pipe is straight.

A further object of the invention is to provide a pipe straightener which has a multiplicity of transversely arranged V-shaped rollers, the axis of which are normally parallel, but which sets of rollers may be arranged angularly, in opposed relation to the other set of rollers.

Still a further object of the invention is to provide a portable pipe straightener having a structural mounting frame to support a plurality of V-shaped rollers thereon, with a superstructure to support hydraulic cylinders, each cylinder having a roller mounted thereon, which rollers are in opposed relation to the rollers mounted on the structural frame, which rollers are adjustable angularly in unison but in opposed relation to the angularity of the rollers on the structural frame.

A further object of the invention is to provide power driven means to drive at least one roller of a group of rollers and at least two rollers of the other group of rollers at the same speed so as to remove bends and twists from pipe as it passes through the rollers.

BRIEF DESCRIPTION OF THE DRAWINGS

With these objects in mind and others which will become manifest as the description proceeds, reference is to be had to the accompanying drawings in which like reference characters designate like parts in the several views thereof, in which:

FIG. 1 is a perspective view of a trailer mounted, portable pipe cleaning and straightening machine, with parts broken away and shortened to bring out the details of construction;

FIG. 2 is a sectional view taken on line 2—2 of FIG. 1, looking in the direction indicated by the arrows, showing portions of the hydraulic rams, the ram plates to which the plunger is connected, and a hydraulic motor drive mechanism connected to the V-shaped rollers;

FIG. 3 is fragmentary, sectional view taken on line 3—3 of FIG. 1, looking in the direction indicated by the arrows, showing the lower set of V-shaped rollers, some of which are idler rollers and at least one of which is a power driven roller, showing the plates on which the rollers are mounted, showing a base plate mounting the mounting plate, showing adjustment holes on the structural frame by which to vary the center distance between the rollers, and showing a hydraulic mechanism for actuating the mounting plate to simultaneously vary the angularity of the V-shaped rollers;

FIG. 4 is a sectional view taken on line 4—4 of FIG. 1, showing the V-shaped rollers adjusted transversely of the structural frame, with the axes thereof parallel and showing a pipe in dashed outline therebetween;

FIG. 5 is an elevational view, partly in section, with parts broken away, showing a base plate mounted on the structural frame and showing a mounting plate rotatably mounted thereon, which base plate mounts a power means connected in driving relation with a sprocket on a roller shaft to drive the V-shaped rollers thereon, which is typical of all the power driven rollers;

FIG. 6 is a diagrammatic view of the upper and lower V-shaped rollers, each set of rollers being adjusted to 45° and in opposed relation to the upper rollers with respect to the lower rollers;

FIG. 7 is a diagrammatic view of the fluid system for actuating the various elements of the machine, showing the fluid supply and the pumping system therefor; and FIG. 8 is a view of a modified form of adjusting means, both for the base plate and the rotatable mounting plate mounted thereon, showing a rack to enable the base plate to be quickly adjusted longitudinally of a structural frame in either direction with respect to the center base plate, and showing a rack and gear segment interengaged with the mounting table, which mounts the rollers to enable an adjustment to be made on all the rollers simultaneously by a mechanical device, such as shown in FIG. 6.

DESCRIPTION OF THE PREFERRED EMBODIMENTS

With more detailed reference to the drawings, the numeral 1 designates generally the pipe straightening machine which has an axle 2 with wheels 4 thereon, with a forwardly extending tongue 6. A structural frame 8 is mounted on and supported by the axle 2 of the trailer and has a superstructure thereon, which comprises pairs of upright, transversely spaced apart structural members 10 and 12 secured to elongated, structural frame 8, forming a base. Upright members 12 are likewise spaced apart transversely, with the pairs of upright structural members 10 and 12 being spaced apart longitudinally of frame 8, to form an upright support frame as will best be seen in FIG. 1.

The tongue 6 is welded to structural frame 8 and extends longitudinally therefrom. The structural frame 8 is composed of a pair of channel members which are spaced apart transversely and have braces 14 and 16 at opposite ends to hold these channel members in rigid relation with respect to each other. Base plates 18 extend across the upper face of structural frame 8 and are bolted thereto by bolts 20, which form fastening means which pass therethrough and through the flanges of the channel members which form the structural frame 8. The upper flanges of the channels of structural frame 8 have longitudinally spaced apart holes 22 therein to enable the adjustment of the base plates 18 with respect to the upper surface of the structural frame 8, as will be more fully brought out hereinafter. By the adjustment of the outer base plates 18 toward or away from the center base plate 18 the distance between the axes of V-shaped rollers 24 with respect to V-shaped roller 26 may be varied, which is a desirable adjustment when cleaning pipes of different diameters.

The rollers 24 and 26 are mounted on shafts 28 and 30, which shafts are mounted on bearings 29 and 31, respectively, which bearings are mounted on upright lugs 32 and 34 respectively, which lugs are secured to mounting plates 36 and 38 respectively. The rollers 24 are V-shaped idler rollers and are free to rotate about the axis of shafts 28. The roller 26 is a power driven V-shaped roller, with the axis thereof being parallel to the axis of the rollers 24, regardless of whether the axis of the rollers 24 and 26 are arranged transversely, perpendicular to a vertical, medial plane passing longitudinally through the structural frame 8, or whether the axis of the rollers are angulated with respect to said longitudinal, vertical, medial plane passing through the structural frame 8.

The roller 26 has the shaft 30 fixedly secured thereto, which shaft has a sprocket 40 fixedly secured thereto, which sprocket is connected in driven relation, by a chain 42, with a sprocket 44 on the shaft of motor 46. The motor 46 may either be hydraulic, pneumatic, or electric, but for sake of illustration, a hydraulic motor is shown. The motor 46 is mounted on one of the lugs 34, which are secured to the mounting plate 38.

The mounting plates 36 and 38 are each secured to the respective vertical shafts 48 so that the mounting plates may be moved arcuately, in bearings on the base plates 18, up to 45° with respect to the position as shown in FIG. 3. The angular position of the mounting plates is better shown diagrammatically in FIG. 6, which shows the adjustment of both the lower and upper rollers, as will be more fully brought out hereinafter.

The mounting plates 36 and 38 each have outwardly extending apertured arms 50 and 52 respectively, to which arms bolts 54 and 56 pivotally connect longitudinal adjustment member 58 thereto, so upon longitudinal movement of adjustment member 58, each mounting plate 36 and 38 will be rotated the same degree, with the axis of the respective V-shaped rollers being parallel. A fluid cylinder 60 is pivotally connected, by pin fastening means 62, to the longitudinal adjustment member 58, so upon selective application of fluid pressure to one end or the other of the fluid cylinder 60, the plunger 64 therein will be moved to rotate the mounting plates 36 and 38 about their respective axes so as to perform the straightening operation on pipe, round tubular members, or rods, as will be more fully brought out hereinafter.

The base plates 18 have guide members 66 secured to the lower side thereof, so as to prevent rotation of the base plates and to permit longitudinal sliding of the base plates 18 with respect to structural frame 8 to enable the proper longitudinal adjustment of the outer base plates with respect to the central base plate 18.

A V-shaped trough 68 is mounted above the tongue 6 and is supported thereon by support members 70 and bracing 72, which trough is of substantial length, with the V thereof at a level to direct the pipe or tubular members to be straightened onto the V-shaped rollers 24 and 26. The trough 68 is of the proper height for workmen to handle the pipe, tubular member, or rods to be straightened with a minimum amount of inconvenience and fatigue. A support member 74 is positioned near the forward end of the tongue 6 to support the tongue in horizontal position when trailer hitch 76 is disconnected from the vehicle which normally tows the rotary pipe straightener.

The hydraulic system is normally contained on the towing vehicle, with the towing vehicle (not shown) connected being to the trailer hitch 76, however, any form of fluid pressure system may be used and powered by any type motor, such as that shown diagrammatically in FIG. 7.

The superstructure, comprising members 10 and 12, has transverse header members 11 and 13 thereacross and secured thereto, as will best be seen in FIGS. 1 and 4. These header members serve to rigidly mounted the upper end of fluid cylinders 78 and 80, which form mechanical lower means. The cylinders 78 and 80 extend downward and have plungers 82 and 84, respectively therein, which plungers are raised and lowered by fluid pressure. The lower ends of the respective plungers 82 and 84 are secured to upper mounting plates 86 and 88, respectively, as will best be seen in FIGS. 1, 2 and 4. V-shaped rollers 87 and 89 are mounted on the respective mounting plates 86 and 88, the axes of which rollers are parallel.

Guide members 90 and 92 are secured to the upper faces of the respective mounting plates and extend upward into hollow tubular guides 94 and 96. The guide members 90 and 92 are parallel to the axes of plungers 82 and 84 so as to enable the plungers 82 and 84 to move freely in a vertical position.

Arms 98 and 100 are journaled on the respective cylinders 78 and 80 in spaced apart relation and extend outward and are secured to the respective hollow tubular guides 94 and 96, as by welding, which outwardly extending arms are apertured to receive pivot pins or bolts 102 and 104 therethrough, as will best be seen in FIGS. 2 and 6, to each which arm is connected a longitudinally movable linkage member 106 by pivot pins 102 and 104. The movable linkage is connected to a pivoted lever 108 by a linkage 110. The pivoted lever 108 is pivotally mounted on a pivot member 112 mounted on the upright structural member 12. The lower end of the lever 108 is pivotally connected to longitudinal adjustment member 58 by a linkage 114, so upon movement of plunger 64 of fluid actuated cylinder 60, the longitudinally movable linkage member 106 will be moved in the opposite direction to the movement of longitudinal adjustment member 58, so that the outwardly extending levers 98 and 100 will rotate about the axis of the respective hydraulic cylinders 78 and 80 to rotate the respective plungers 82 and 84, which, in turn, will rotate the respective mounting plates 86 and 88, secured thereto, to the same degree as the mounting plates 36 and 38, but in an opposite direction, as will best be seen in FIG. 6.

The plungers 82 and 84 are independently movable in either direction by fluid pressure, as will be more fully brought out hereinafter.

The upper mounting plates 86 and 88 are constructed substantially in the same manner as the mounting plates shown in FIG. 5, and each has a motor 116 and 117 respectively thereon, which motors are mounted in the same manner as the motor 46, each which motor has a sprocket and chain arrangement 118 similar to that shown in FIG. 5. The motors 116 and 117 rotate in the same direction and motor 46 rotates in the opposite direction, with all motors being reversible. The motors are connected in series relation by conduits and rotate at the same RPM in synchronized relation, as the hydraulic fluids pass therethrough, in a fluid circuit shown diagrammatically in FIG. 7. The fluid actuated cylinders 78 and 80 are individually controlled by the respective valves 166 and 168, as shown in FIG. 7. The valves are preferably four-way valves to operate the cylinders in both directions in event double acting cylinders are used. A valve 162, which is also a four-way valve, as shown in FIG. 7, is used to control the fluid to fluid actuated cylinder 60.

Each of the mounting plates 86 and 88 each has a pair of downwardly extending lugs 120 thereon, on each which pair of lugs is mounted bearings 122 which journal the respective shafts 124 and 126, the axes of which shafts are parallel, FIG. 2. Each of the shafts has a sprocket fixedly secured thereto and connected in power driven relation with the respective motors 116 and 117, which sprocket and gear arrangement 118 is substantially as shown in FIG. 5.

The fluid cylinders 78 and 80 are braced against lateral movement by braces 128, 130 and 132, as will best be seen in FIGS. 1 and 4. The upright structural members 10 and 12 are each braced by the respective braces 134 and 136, as will best be seen in FIGS. 1 and 4. While the device is shown as being trailer mounted, this merely shows a trailer as a convenient mode of transportation, since the device will operate equally well either as a permanent installation or if mounted on skids or the like.

Each of the upright members 10 has a longitudinally arranged sleeve 138 on the outer side to slidably receive bars 140, which bars are attached to a conical guide member 142. The guide member 142 has supporting legs 144, supports and center pipes, tubular members or the like which are passed therethrough. When the pipe straightening device is not in use, the bars 140 slide within sleeves 138 so the conical guide member 142 will rest on the rear end of the structural frame 8, so the entire machine may be self contained while being moved from place to place.

The fluid system is shown diagrammatically in FIG. 7, and has a fluid supply reservoir 146 from which a suction conduit 148 leads and into pumping system 150, which pumping system may be a component part of the towing vehicle or it may be driven by a separate and independent motor or engine, not shown. The pumping system 150 directs fluid, under pressure, usually hydraulic fluid, into conduit 152 which forms a manifold, to direct fluid into outlets 154, 156, 158 and 160 and into the respective four-way valves 162, 164, 166 and 168.

The four-way valve 162 has conduits 170 and 172 leading therefrom to opposite ends of fluid actuated cylinder 60 so as to actuate the plunger 64 thereof, in the manner hereinbefore set out, so as to shift the angularity of the V-shaped rollers. The exhaust fluid from the cylinder 60 will be directed into the four-way valve and out through conduit 174 into conduit 176, which returns the fluid to the reservoir 146.

The four-way valve 164 has conduits 178 and 180 leading therefrom to and through fluid actuated motors 116, 46 and 117, with the fluid returning to the four-way valve 164 and exhausting through conduit 182 into conduit 176 to return to reservoir 146, if hydraulic fluid is used. By switching the four-way valve 164 to the opposite position, the hydraulic motors 116, 46 and 117 may be operated in the opposite direction to rotate the V-shaped rollers 87, 26 and 89 in either direction to propel the pipe therethrough and to straighten the pipe.

The angularity of the opposed, V-shaped rollers will perform a precision straightening action after the preliminary straightening action has been performed when the rollers are arranged in transverse relation.

The hydraulic valve 166 has conduits 186 and 188 leading therefrom and to opposite ends of fluid actuated cylinder 78 on which mounting plate 86 is positioned. The mounting plate 86 mounts the power driven V-shaped roller 87 thereon, which is driven in the manner hereinbefore set out, and with the hydraulic fluid being directed into conduits 186 and 188 from four-way switching valve 166, the plunger 82 is moved in one direction and hydraulic fluid is exhausted through conduit 188 into and through four-way valve 166 and into conduit 190 which connects with conduit 176 leading to reservoir 146, when a hydraulic fluid is used. By moving the four-way valve 166 to another position, the direction of plunger 82 is reversed. In this manner, the pressure on the V-shaped roller 87 on mounting plate 86 may be engaged with the pipe or the like, being straightened, to the desired degree.

Hydraulic fluid is directed under pressure from branch conduit 160 into four-way valve 168 which fluid passes through the hydraulic valve and into conduit 192 to move the plunger 84 in one direction, with the fluid exhausting outward from cylinder 80 into conduit 194 into and through four-way valve 168 to exhaust fluid therethrough into branch conduit 196 leading to conduit 176 and to reservoir 146, if hydraulic fluid is used. To move the plunger 84 in the opposite direction, the lever of the four-way valve 168 is moved to the opposite position and the hydraulic fluid is directed into the opposite end of cylinder to move the plunger 84 in the opposite direction.

OPERATION

With the pipe straightening machine 1 set up in operating position, substantially as shown in FIG. 1, and with a source of power, such as hydraulic fluid being directed thereto, as shown in FIG. 7, pipe P, as shown in dashed outline in FIG. 4, is passed into and between rollers 24, 89, 26, 87 and 24, with the proper pressure applied to the rollers 87 and 89, and with the motors 116 and 117 operating in one direction, with the motor 46 operating in the opposite direction, the pipe will be moved longitudinally between the rollers, with the rollers adjusted so that the axes thereof are perpendicular to a vertical plane passing medially through the V-groove of the rollers, certain straightening action of the pipe is had. However, by angulating the rollers from zero degrees to approximately 45°, as shown in FIG. 6, with the motors rotating the V-shaped rollers to move the pipe therebetween in either direction at the same time, the pipe will be rotated, by reversing the motors which drive the V-shaped rollers angulated, the pipe will be rotated in the opposite direction. The V-shaped rollers, thus angulated, will cause the pipe to be straightened to a high degree of perfection. The pipe will then be passed out through conical member 142, and another length of pipe P may be passed into the straightening machine 1.

MODIFIED FORM OF THE INVENTION

A modified form of the invention is shown in FIG. 8 in which the structural frame member 8 has a toothed rack 201 secured to a side thereof. The base plates 202 have guide members 204 on the lower side thereof to fit between the structural frame 8 so when the teeth 206 of the respective base plates 202 engage the rack teeth, the base plates will be held against longitudinal or rotary movement without the necessity of bolting. In this manner, the outer base plates 202 may be readily adjusted with respect to the center base plate 202 which has a power driven V-shaped roller 218 mounted thereon, such as shown in FIG. 5. A longitudinally movable rack 208 engages arcuate toothed portion 210 on each of the mounting plates 212 which are positioned on the base plates 202 and are rotatably mounted in the same manner as the base plates shown in FIG. 5. The teeth 214 of the longitudinal movable rack 208 engage the teeth 210, so upon reciprocation of the rack, as by the use of a fluid actuated cylinder 60 and plunger 64, the mounting plates 212 are angulated to cause the respective V-rollers 216, 218 and 216 to be angulated in the same manner as the rollers shown in FIG. 6. Rollers 220 are mounted in journaled relation on structural frame member 8 to hold the rack teeth 214 in engagement with the arcuate teeth 210 on mounting plates 212. This form of the invention otherwise performs in the same manner as the form of the invention as shown in FIGS. 1 through 7.

I claim:
1. A rotary pipe straightening device which device comprises;
   a. an elongated base,
      1. spaced apart adjusting means along a portion of the length of said elongated base,
   b. a plurality of spaced apart base plates on said elongated base,
      1. fastening means on said base plates interengageable with said spaced apart adjusting means on said elongated base to selectively hold said base plates in fixed relation relative thereto,
      2. bearing means on each said base plate to receive a shaft therein,
   c. a plurality of mounting plates, one said mounting plate on each said base plate,
      1. a shaft extending outwardly from each said mounting plate and each said shaft being journaled in the bearing means in each said base plate for limitated rotation of each said mounting plate about the respective axes of said shafts,
      2. a V-shaped roller mounted on a first axis on each said mounting plate, on the opposite side thereof from said outwardly extending shaft, for rotation of each said V-shaped roller about the axis thereof at a right angle to the axis of each said outwardly extending shaft,
      3. the first axes of said rollers, on said elongated base, being parallel,
      4. at least one of said V-shaped rollers on said elongated base being power driven,
   d. an upright support frame connected to said elongated base,
   e. mechanical power means mounted on said upright support frame for movement thereof along vertical axes,
      1. a mounting plate on the lower end of said mechanical power means,

2. each said mechanical power means having a V-shaped roller mounted on the mounting plate thereof, on a second axis, in rotatable relation on the lower end thereof transversely to said vertical axis.
3. the second axes of said V-shaped rollers on said mechanical, vertically movable power means being substantially parallel,
4. At least one of said V-shaped rollers on said mechanical, vertically movable power means being power driven about one of said second axes, f. a power supply connected with said power means to selectively move the respective rollers along a vertical path,
g. mechanical adjustment means to selectively adjust the angularity of the axes of said second V-shaped rollers mounted on said elongated base,
h. further mechanical adjustment means to selectively adjust the angularity of the axes of said second V-shaped rollers mounted on said mechanical, vertically movable power means, and
i. power means connected in driving relation with said V-shaped rollers mounted on said vertically movable, mechanical power means so as to direct pipe between said V-shaped rollers mounted on said elongated base, and said rollers mounted on said vertically movable, mechanical power means so as to straighten the pipe as it passes therethrough.

2. A rotary pipe straightener, as defined in claim 1; wherein
a. said V-shaped rollers, which are power driven, are driven by hydraulic motors.

3. A rotary pipe straightener, as defined in claim 1; wherein
a. at least one of said V-shaped rollers, mounted on said elongated base, being power driven by a hydraulic motor,
b. at least one of said V-shaped rollers, mounted on said mechanical, vertically movable power means, being driven by a hydraulic motor, and
c. pump means furnishing hydraulic power to said hydraulic motors.

4. A rotary pipe straightener, as defined in claim 1; wherein
a. mounting plates mounting said V-shaped rollers for arcuate movement about said further axes perpendicular to axis of the rollers,
1. said mounting plates mounting said V-shaped rollers, each having an outwardly extending arm,
2. linkage means connecting each said arm for simultaneous movement of said V-shaped rollers about said axes, perpendicular to the respective first axis of each said V-shaped roller,
b. lever means pivotally connected to said roller mounting slate on said upright support frame and to said roller mounting slate on said elongated base to move the respective rollers on said upright support frame and said rollers on said roller mounting means on said elongated base in opposed, angulated relation, and
c. hydraulic cylinder means connected with one of said linkages so as to simultaneously move said rollers about said axis transverse to the axis of said V-shaped rollers.

5. A rotary pipe straightener, as defined in claim 1; wherein
a. said mechanical power means mounted on said support frame for movement about a vertical axis, is hydraulic cylinders.

6. A rotary pipe straightener, as defined in claim 1; wherein
a. said base has at least one elongated toothed rack means along a face thereof,
b. a toothed base plate mounting each V-shaped roller on said elongated base, with said teeth on said plate being interengageable with said toothed rack on the face of said elongated base, and
c. means interengageable with said elongated base to prevent lateral movement of said base plate,
d. teeth on said mounting plate on said elongated base to prevent longitudinal movement thereof,
e. a second toothed rack supported on said elongated base,
1. the teeth of said second rack being engageable with the teeth of said toothed mounting plate, so upon lineal movement of said second toothed rack, said mounting plates will be rotated arcuately about the axes of the respective shafts.

7. A rotary pipe straightening device as defined in claim 1; wherein
a. said mechanical adjustment means and said further mechanical adjustment means are connected by linkage means to simultaneously adjust the angularity of said V-shaped rollers with respect to a vertical plane passing medially through said elongated base.

8. A rotary pipe straightening device as defined in claim 7; wherein
a. said means for simultaneously adjusting the angularity of said V-shaped rollers on said elongated base and the angularity of said V-shaped rollers on said mechanical power means, moves the axes of the V-shaped rollers an equal angular distance with respect to the medial vertical plane, but in opposite directions.

9. A rotary pipe straightening device as defined in claim 1; wherein
a. support bars extend outward from said upright support frame,
b. a frustro-conical member, having an opening formed in the distal end thereof, mounted on said bars and lying substantially in a vertical medial plane passing longitudinally through the valley of said V-shaped rollers,
c. support means for said frustro-conical member, so pipe will be guided therethrough and outward through the opening formed in the distal end thereof.

* * * * *